US012596834B2

(12) United States Patent
Ahn et al.

(10) Patent No.: US 12,596,834 B2
(45) Date of Patent: Apr. 7, 2026

(54) METHOD OF PROCESSING DATA FOR PERSONAL INFORMATION PROTECTION AND APPARATUS USING THE SAME

(71) Applicant: XPERIX INC., Seongnam-si (KR)

(72) Inventors: Wonseok Ahn, Seongnam-si (KR); BoGun Park, Seoul (KR)

(73) Assignee: XPERIX INC., Seongnam-si (KR)

( * ) Notice: Subject to any disclaimer, the term of this patent is extended or adjusted under 35 U.S.C. 154(b) by 203 days.

(21) Appl. No.: 18/196,431

(22) Filed: May 11, 2023

(65) Prior Publication Data

US 2024/0160777 A1 May 16, 2024

(30) Foreign Application Priority Data

Nov. 14, 2022 (KR) ........................ 10-2022-0151671

(51) Int. Cl.
| *G06F 7/04* | (2006.01) |
| *G06F 15/16* | (2006.01) |
| *G06F 21/62* | (2013.01) |
| *G06T 7/11* | (2017.01) |
| *G06V 10/776* | (2022.01) |
| *H04L 29/06* | (2006.01) |

(52) U.S. Cl.
CPC ............ *G06F 21/6245* (2013.01); *G06T 7/11* (2017.01); *G06V 10/776* (2022.01); *G06T 2207/20021* (2013.01); *G06T 2207/30201* (2013.01)

(58) Field of Classification Search
CPC ...... G06F 21/6245; G06T 7/11; G06V 10/776
USPC .......................................................... 726/6
See application file for complete search history.

(56) References Cited

U.S. PATENT DOCUMENTS

| 11,164,046 B1 * | 11/2021 | Kim | .................... G06F 21/6254 |
| 2016/0148070 A1 * | 5/2016 | Tate | ........................ G06V 20/00 |
| | | | 382/195 |

FOREIGN PATENT DOCUMENTS

| KR | 10-1887415 B1 | 8/2018 |
| KR | 10-2357801 B1 | 2/2022 |
| KR | 2022-0060722 A | 5/2022 |

OTHER PUBLICATIONS

Ma et al.,AdaDeld: Adjust Your Identity Attribute Freely, Aug. 2022, University of Chinese Academy of Sciences, pp. 210-216 (Year 2022).*
Li et al. SF-GAN: Face De-Identification Method Without Losing Facial Attribute Information, Jan. 2021, IEEE Signal Processing Letters, vol. 28, pp. 1-5 (year 2021).*

(Continued)

*Primary Examiner* — Jeffrey C Pwu
*Assistant Examiner* — Samuel Ambaye
(74) *Attorney, Agent, or Firm* — Maschoff Brennan

(57) ABSTRACT

Provided are a method of processing data for protecting personal information and an apparatus using the same. The method of processing data, which is a method for providing a data processor terminal with processing target data, includes acquiring a first original image and a second original image, segmenting the first original image into a plurality of regions including a first region, segmenting the second original image into a plurality of regions including a second region, generating a first processing target image including at least a partial region of the first region and at least a partial region of the second region, and providing the generated first processing target image to a data processor terminal.

15 Claims, 11 Drawing Sheets

(56)       References Cited

OTHER PUBLICATIONS

European Search Report dated Oct. 27, 2023 as received in application No. 23172373.5.
Ma et al. "AdaDeId: Adjust You Identity Attribute Freely" Aug. 21, 2022.
Li et al. "SF-GAN: Face De-Identification Method Without Losing Facial Attribute Information" 2021.
Cecilia Summers et al., Improved Mixed-Example Data Augmentation, IEEE Winter Conference on Applications of Computer Vision, Jan. 19, 2019.
Korean Office Action issued in corresponding application No. 10-2022-0151671, dated Nov. 14, 2023.

* cited by examiner

4100

4110

4200

4210

4300

4310

METHOD OF PROCESSING DATA FOR PERSONAL INFORMATION PROTECTION AND APPARATUS USING THE SAME

CROSS-REFERENCE TO RELATED APPLICATION

This application claims priority to and the benefit of Korean Patent Application No. 10-2022-0151671, filed on Nov. 14, 2022, the disclosure of which is incorporated herein by reference in its entirety.

BACKGROUND

1. Field of the Invention

The present invention relates to a method of processing data for protecting personal information and an apparatus using the same.

2. Discussion of Related Art

Neural network models are widely used to analyze data, such as images, text, and audio. In order to improve the accuracy of a neural network model, the neural network model needs to be trained using a large amount of training data. In addition, in order to train a neural network model, training data needs to be labeled. Labeling is generally performed by a worker looking at original data and matching appropriate labeling information with the original data. However, original data may include personal information, such as a person's face, a fingerprint, an identification card, and a vehicle license plate, that is, sensitive information, and in a process of labeling such original data, the personal information of the original data may be exposed to the worker.

Recently, a great deal of research has been conducted to resolve such issues.

SUMMARY OF THE INVENTION

The present invention is directed to providing a method of processing data capable of preventing exposure of personal information that may occur in a data processing process such as a labeling process.

The technical objectives of the present invention are not limited to the above, and other objectives may become apparent to those of ordinary skill in the art based on the following descriptions.

According to an aspect of the present invention, there is provided a method of processing data which is a method for providing a data processor terminal with processing target data, the method including acquiring a first original image and a second original image, segmenting the first original image into a plurality of regions including a first region, segmenting the second original image into a plurality of regions including a second region, generating a first processing target image including at least a partial region of the first region and at least a partial region of the second region, and providing the generated first processing target image to a data processor terminal.

The technical solutions of the present specification are not limited to the above, and other solutions may become apparent to those of ordinary skill in the art based on the following description and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
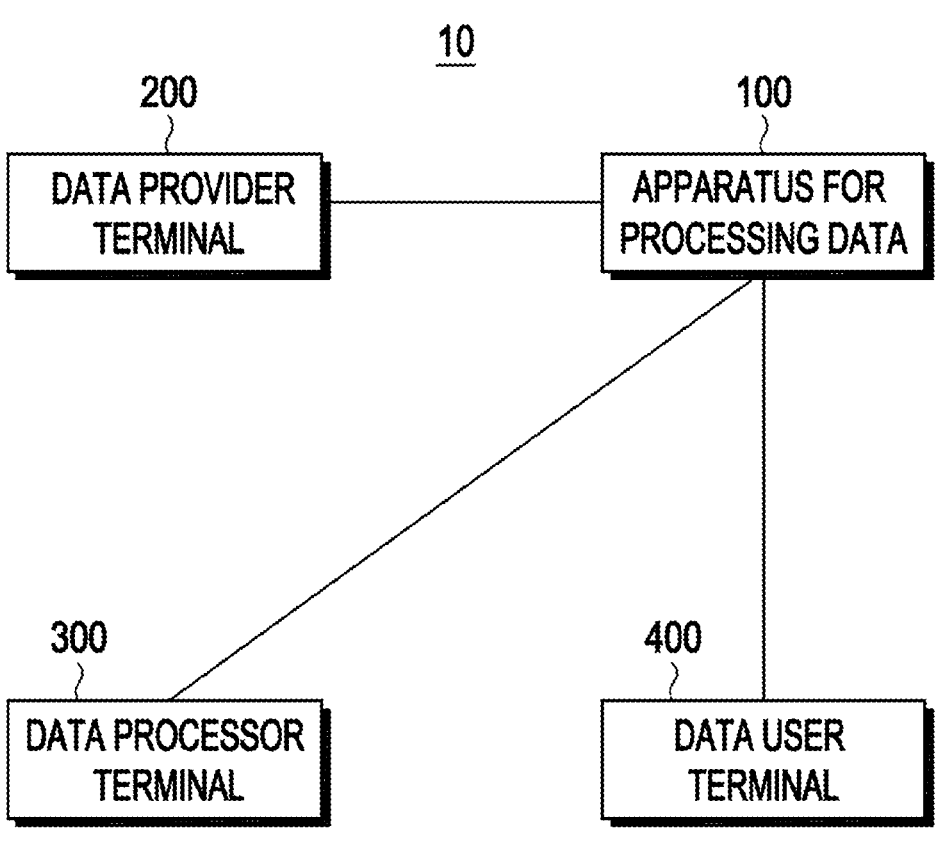
FIG. 1 is an environment diagram illustrating a data trust system according to an embodiment.

Embodiments described in this specification are made to clearly explain the scope of the present invention to those having ordinary skill in the art and are not intended to limit the present invention. It should be interpreted that the present invention may include substitutions and modifications within the technical scope of the present invention.

Terms used herein have been selected as general terms which are widely used at the present in consideration of the functions of the present invention but may be altered according to the intent of an operator of ordinary skill in the art, conventional practice, or the introduction of new technology. However, when a specified term is defined and used in an arbitrary sense, a meaning of the term will be described separately. Accordingly, the terms used herein are not to be defined as simple names of the components but should be defined based on the actual meaning of the terms and the whole context throughout the present specification.

The accompanying drawings of the specification are for facilitating the explanation of the present invention and a shape in the drawings may be exaggerated for the purpose of convenience of explanation, and thus the present invention is not to be limited to the drawings.

In the specification, details of generally known functions and structures which obscure the subject matter of the present invention will be omitted as required. Hereinafter, a method of processing data and an apparatus using the same according to an embodiment of the present invention will be described.

FIG. 1 is an environment diagram illustrating a data trust system according to an embodiment.

Referring to FIG. 1, a data trust system 10 may include an apparatus 100 for processing data, a data provider terminal 200, a data processor terminal 300, and a data user terminal 400.

The apparatus 100 for processing data may communicate with at least one of the data provider terminal 200, the data processor terminal 300, and the data user terminal 400 and transmit/receive various types of information. In the specification, the apparatus 100 for processing data is referred to as an apparatus, but it is not limited thereto, and the apparatus 100 for processing data may serve as a server.

In one embodiment, the apparatus 100 for processing data may perform data trust. For example, the apparatus 100 for processing data may acquire data from the data provider terminal 200, and according to a request of the data user terminal 400, provide the data to the data user terminal 400. In this case, in order to increase the usability of the data provided to the data user terminal 400, the apparatus 100 for processing data may provide the data user terminal 400 with processed data. In this case, data processing may be performed by the data processor terminal 300.

Specifically, the data provider terminal 200 may provide the apparatus 100 for processing data with original data. In this case, the original data may be various types of data, such as images, videos, text, and audio. The apparatus 100 for processing data may, in order to process the original data, provide processing target data acquired from the data provider terminal 200 to the data processor terminal 300. In this case, the apparatus 100 for processing data may generate the processing target data for the data processor terminal 300 by processing the original data. For example, in order to prevent security information included in the original data from being exposed in the data processor terminal 300, the apparatus 100 for processing data may process the original data such that the security information is not identified by the data processor terminal 300. Here, the security information represents information that should not be disclosed to unspecified persons, and includes, for example, personal information or private information.

The data processor terminal 300 may process the processing target data acquired from the apparatus 100 for processing data in various methods. For example, the data processor terminal 300 may perform processing of generating landmark information on a face image, perform processing of generating feature point information on a fingerprint image, and perform processing on an image including text, such as a vehicle license plate image, to generate information about the corresponding text. In addition to the above, the data processor terminal 300 may perform processing on various types of processing target data. In one example, processing of data may be expressed as labeling of data.

The apparatus 100 for processing data may acquire the processed data from the data processor terminal 300. In this case, the apparatus 100 for processing data may provide the data processor terminal 300 with a reward corresponding to acquisition of the processed data.

In addition, the apparatus 100 for processing data may provide information about the original data or the processed data to the data user terminal 400 and acquire a request for providing the original data or the processed data from the data user terminal 400. The apparatus 100 for processing data may provide the requested data to the data user terminal 400 in response to the request.

Figure 2:
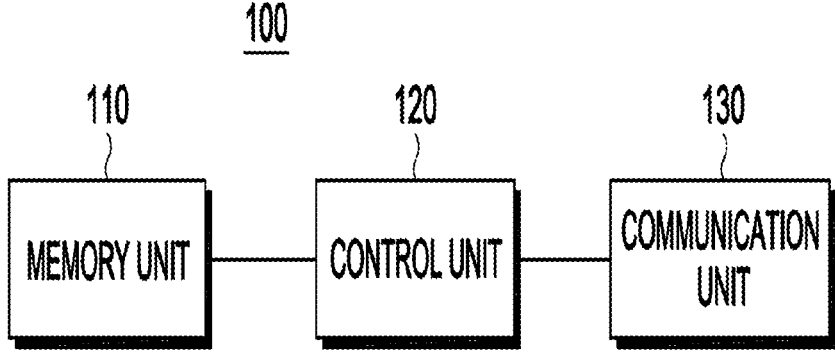
FIG. 2 is a block diagram illustrating an apparatus for processing data according to an embodiment.

FIG. 2 is a block diagram illustrating an apparatus for processing data according to an embodiment.

Referring to FIG. 2, the apparatus 100 for processing data may include a memory unit 110, a control unit 120, and a communication unit 130.

The control unit 120 may, when processing original data acquired from the data provider terminal, process the original data to generate processing target data.

In one embodiment, the control unit 120 may process the original data to generate the processing target data, in order to prevent security information included in the original data from being exposed during data processing in the data processor terminal.

The control unit 120 may include at least one of a central processing unit (CPU), a graphics processing unit (GPU), one or more microprocessors, and other electronic components for processing input data according to a predetermined logic.

In addition, the control unit 120 may be implemented in software, hardware, or a combination thereof. For example, the control unit 120 may be implemented, in the form of hardware, as a field programmable gate array (FPGA), an application specific integrated circuit (ASIC), a semiconductor chip, or various other types of electronic circuits. In addition, in the form of software, the control unit 120 may be implemented in a logic program executed according to the above-described hardware or various computer languages.

In addition, the memory unit 110 may store instructions for controlling the control unit 120, and the control unit 120 may perform an operation based on the instructions stored in the memory unit 110.

In addition, the memory unit 110 may store instructions, programs, necessary information, and the like for generating processing target data based on original data.

In addition, the memory unit 110 may include at least one type of storage medium from among a flash memory type, a hard disk type, a multimedia card micro type, a card type memory (e.g., Secure Digital (SD), eXtreme Digital (XD) memory, etc.)), a random access memory (RAM), a static RAM (SRAM), a read-only memory (ROM), an electrically erasable programmable ROM (EEPROM), a programmable ROM (PROM), a magnetic memory, a magnetic disc, and an optical disc. In addition, the memory may store information temporarily, permanently or semi-permanently, and may be provided in a built-in or removable type.

The communication unit 130 may communicate with a data provider terminal, a data processor terminal, and/or a data user terminal.

The communication unit 130 may perform communication mainly according to wireless communication standards, but may include wireless/wired communication modules for transmitting data through a mobile communication module, such as Bluetooth Low Energy (BLE), Bluetooth, a wireless local area network (WLAN), wireless fidelity (Wi-Fi), Wi-Fi Direct, near field communication (NFC), Infrared Data Association (IrDA), ultra-wideband (UWB), ZigBee, 3G, 4G or 5G, and various other communication standards. In addition, the communication unit 130 may include a short-range wireless module supporting NFC, radio-frequency identification (RFID), and the like.

In addition, the apparatus 100 for processing data may be implemented in the form of a server.

In addition, the apparatus 100 for processing data may be provided in a form including added configurations for performing additional functions and operations according to selection.

In the specification, original data and processing target data may be various formats of data, such as images, videos, text, and audio. Hereinafter, it is assumed that the formats of the original data and the processing target data are images for the sake of convenience of description, and the original data may be referred to as an original image, and the processing target data may be referred to as a processing target image. However, the present invention is not limited thereto, and the original data and the processing target data may be various formats of data, and matters described in the present invention may be applied to data in other formats than images.

Figure 3:
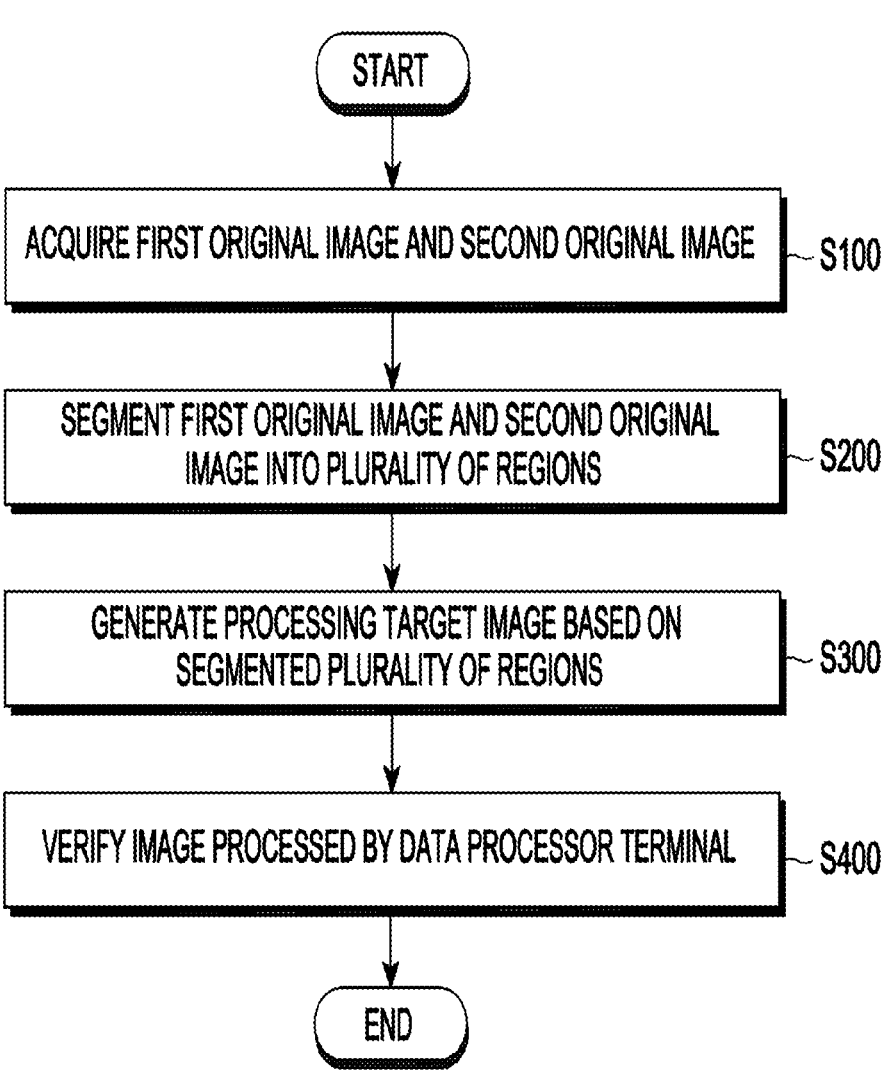
FIG. 3 is a diagram for describing a method of processing data according to an embodiment.

FIG. 3 is a diagram for describing a method of processing data according to an embodiment.

Referring to FIG. 3, a method of processing data according to the embodiment may be performed by the apparatus for processing data described above, and include acquiring a first original image and a second original image (S100), segmenting the first original image and the second original image into a plurality of regions (S200), generating a processing target image based on the segmented plurality of regions (S300), and verifying an image processed by the data processor terminal (S400).

In operation S100, the apparatus for processing data may acquire a first original image and a second original image. Here, the first original image and the second original image may be acquired from the same data provider terminal or each may be acquired from a different data provider terminal. The first original image and the second original image may include various images, such as a face image, a fingerprint image, an image including text, and the like.

In addition, in operation S200, the apparatus for processing data may segment the first original image and the second original image into a plurality of regions in order to generate a processing target image. For example, the apparatus for processing data may segment the first original image and the second original image such that security information of the first original image and the second original image are not identified in the processing target image. In addition, the apparatus for processing data may assign identification information to the segmented region. The assignment of the identification may serve to identify a segmented region in a process of processing data and a process of verifying processed data.

In addition, in one embodiment, the apparatus for processing data may assign segmented region identification information regarding the original image. For example, identification information of regions segmented from the first original image may be #1, and identification information of regions segmented from the second original image may be #2. In this case, the segmented regions may be disposed in the processing target image at the same spatial positions as those in the original image. For example, a first segmented region located at the upper left end of the first original image may be disposed at the upper left end of the processing target image, and a second segmented region located at the lower right end of the first original image may be disposed at the lower right end of the processing target image.

In one embodiment, the apparatus for processing data may segment the first original image and the second original image in various shapes. In this case, the apparatus for processing data may segment the first original image and the second original image such that security information is not identified in the segmented region. For example, when the original image is a face image, the apparatus for processing data may segment the original image such that main features of the face, such as the eyes, the nose, the corners of the mouth, and the like, are not included in one segmented region. In addition, when the original image is an image including text, the apparatus for processing data may segment regions of the original image such that security information of the corresponding text is not identified. In this case, the apparatus for processing data may segment the regions of the original image such that characters of the corresponding text are not separated from each other. In one embodiment, the apparatus for processing data may estimate an expected region in which characters are expected to be included in an original image. For example, the apparatus for processing data may estimate the expected region using text recognition software. In addition, the apparatus for processing data may estimate the expected region using edge detection, a Hough transform, or the like. The apparatus for processing data may segment the original image such that the expected region is not split.

In addition, in one embodiment, the apparatus for processing data may segment regions of the original image without considering whether characters of the original image are separated. For example, the apparatus for processing data may segment the original image into regions larger than an expected size of a character in the original image. In this case, the probability that the character is included in the segmented region may increase. In this case, the apparatus for processing data may estimate the expected size of the character in the original image using a predetermined algorithm, or when the original image is generated in a predetermined document format, estimate the expected size of the character in the original image based on the document format. In addition, since the size of the segmented region is larger than the size of the character even when a character is split by the segmentation of the original image, the probability of the corresponding character being identified by the data processor may increase. In addition, the apparatus for processing data may allow regions including split characters to be included in a plurality of processing target images, so that the split characters may be identified based on a result of processing the segmented characters in the plurality of processing target images.

Operation S200 will be described using FIG. 4.

FIG. 4 is a diagram for describing segmentation of an original image according to an embodiment.

Figure 4A:
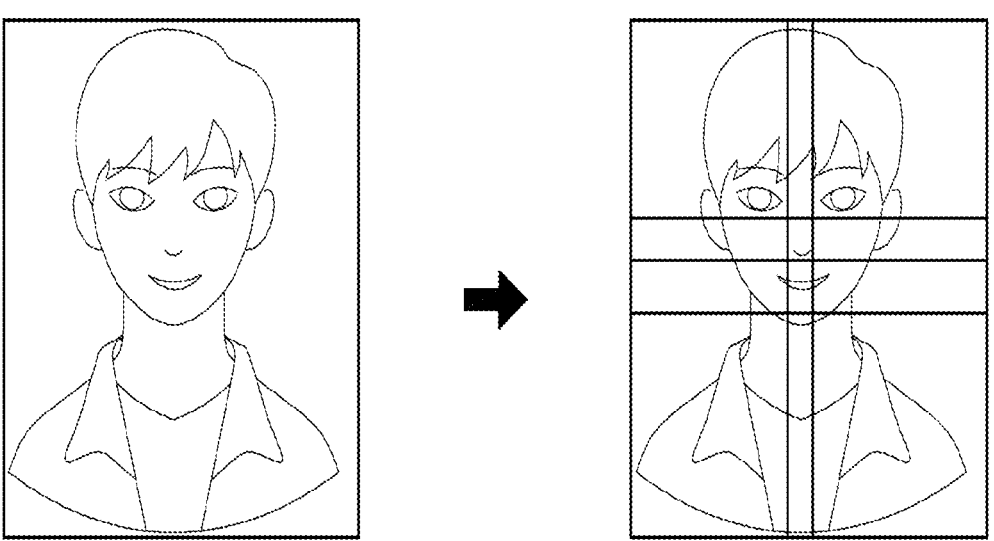
FIGS. 4a and 4b are diagrams for describing segmentation of an original image according to an embodiment.

Referring to FIG. 4A, segmentation of a face image is illustrated, and the apparatus for processing data may segment a face image into a plurality of regions. For example, the apparatus for processing data may be segment regions in horizontal and vertical directions as shown in FIG. 4A. In this case, eyes, a nose, corners of a mouth, etc., which may be features of a face image, may not be included in one region. In addition, the apparatus for processing data may segment the face image such that a single feature of the face image is not split in the segmented region. For example, the apparatus for processing data may segment the face image such that a pupil, which is a single feature, is not split into two or more.

Figure 4B:
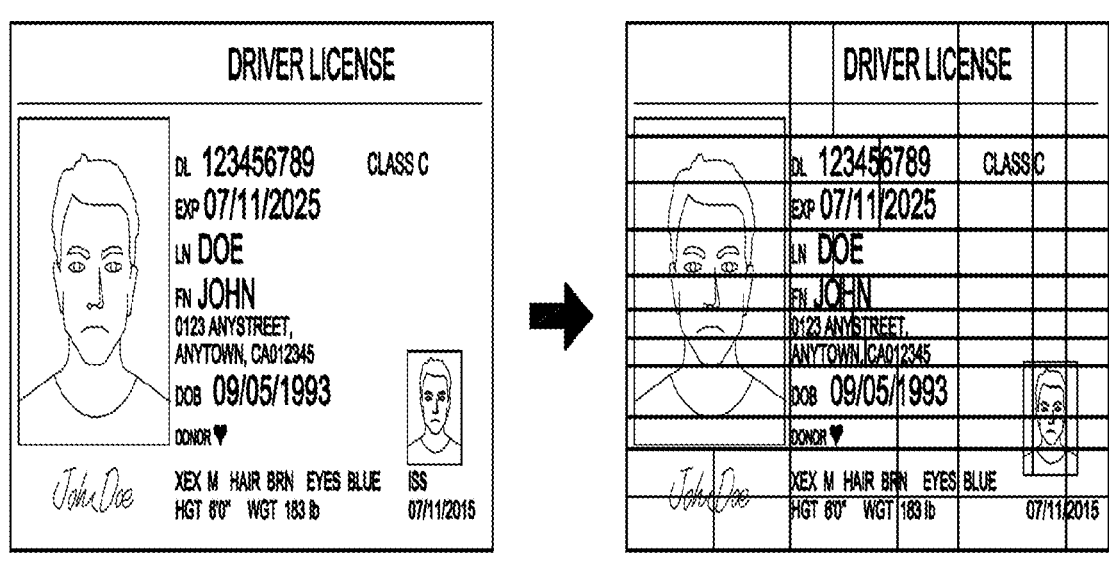

In addition, FIG. 4B illustrates segmentation of a driver's license image. In FIG. 4B, the driver's license image may include a face region and a text region. In FIG. 4B, the face region may be segmented in the vertical direction. Accordingly, each feature of the face may be segmented into a different region. Alternatively, the face region may be segmented in the horizontal direction, or segmented in the vertical direction and horizontal direction, or segmented in various shapes. In this case, although not shown in FIG. 4B, a plurality of facial features may be included in a single region. For example, the two pupils or the two corners of the mouth may be allowed to be included in a single segmented region because it may be difficult to specify the right person of the corresponding face region using only the pupils and the corners of the mouth. However, the face regions may be segmented such that a plurality of facial part features, such as the pupils and the nose, the pupils and the corners of the mouth, the nose and the corners of the mouth, or the pupils and the corners of the mouth, are not allowed to be included in a single segmented region.

In addition, a text region of a driver's license may be segmented in horizontal and vertical directions. Alternatively, a text region may also be segmented into various shapes. In this case, a specific region of the text region may be segmented into sub regions such that the meaning of text letters in the text region is not identified. For example, in the case of the surname □JOHN□ of a name in a text region, the text region may be segmented into sub regions including a sub region including □JO□ and a sub region including □HN□ such that the text region may be segmented to prevent the owner of the driver's license from being identified.

In addition, in operation S300 to be described below, the apparatus for processing data may generate processing target data based on the sub region such that security information is not identified. For example, in operation S300 described below, the sub region including □JO□ and the sub region including □HN□ may be included in different processing target images. In addition, the sub region including □JO□ and the sub region including □HN□ may be included in the same processing target image. In this case, the sub region including □JO□ and the sub region including □HN□ may be disposed at positions spaced apart from each other such that the surname of the owner of the driver's license is not identified.

In addition, in order for the data processor terminal to perform text labeling, the text region may be segmented such that each character of the text region is not split.

Referring again to FIG. 3, in operation S300, the apparatus for processing data may generate a processing target image based on a plurality of segmented regions and provide the generated processing target image to the data processor terminal. The apparatus for processing data may generate a plurality of processing target images using a plurality of segmented regions of a first original image and a plurality of segmented regions of a second original image. In this case, the apparatus for processing data may generate the plurality of processing target images by combining the plurality of segmented regions such that security information of the first original image and the second original image are not exposed.

Operation S300 will be described using FIGS. 5 to 8.

FIGS. 5 to 8 are diagrams for describing generation of processing target images according to an embodiment.

Figure 5:
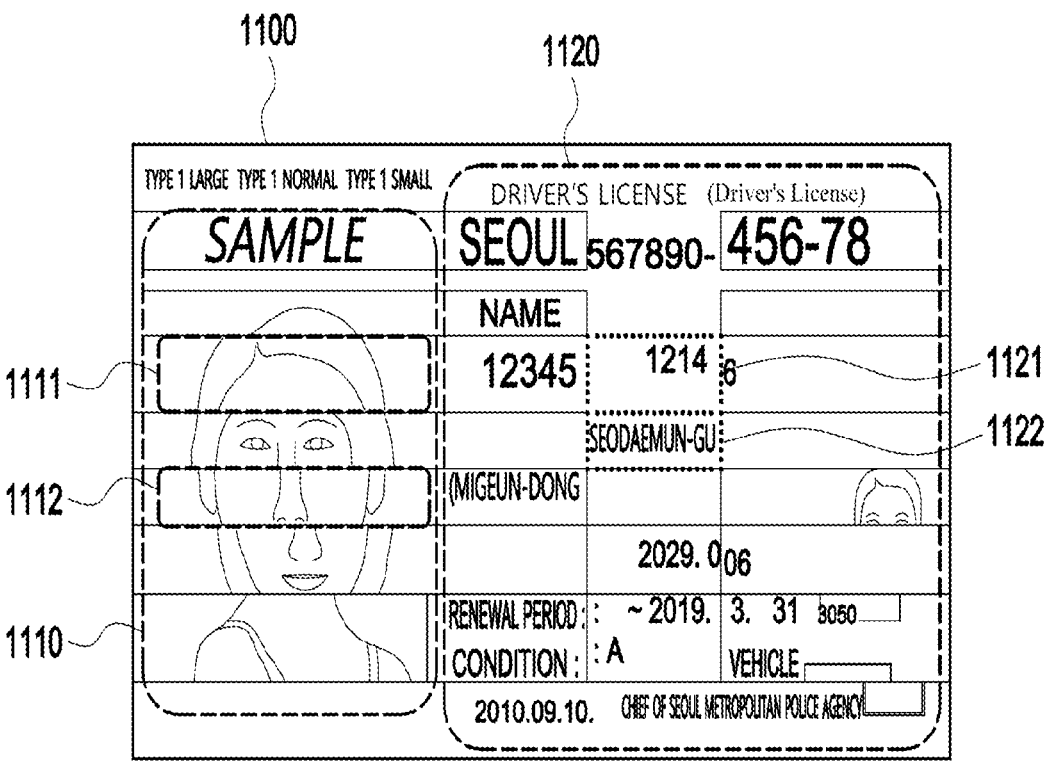
FIGS. 5 to 8 are diagrams for describing generation of processing target images according to an embodiment.

Referring to FIG. 5, a processing target image 1100 may include a face region 1110 and a text region 1120. The processing target image may have the face region 1110 that is generated based on five face images. For example, in the face region 1110, only sub face regions 1111 and 1112 may be regions segmented from the same face image, and the remaining sub face regions may be regions segmented from the other face images. In this case, regions of the five face images are segmented in the vertical direction, and the apparatus for processing data may generate the face region 1110 based on the segmented regions. Accordingly, a specific person may not be identified in the face region 1110, and thus security information may not be exposed.

In addition, the apparatus for processing data may generate the text region 1120 based on three images including text. In this case, regions of the three images including text may be segmented in the horizontal and vertical directions. Accordingly, in the text region 1120, a specific person may not be identified, and thus security information may not be exposed.

In addition, the apparatus for processing data may perform masking on security information such that the security information is identified even in the data processor terminal. For example, the apparatus for processing data may perform masking on information having a high security level among security information. For example, a text region 1121 represents a part of a resident registration number, which is information that allows a specific person to be very easily identified and thus has a high security level. Accordingly, the apparatus for processing data may perform masking on at least a part of the text region 1121 such that the masked region is not identified in the data processor terminal.

In addition, the apparatus for processing data may dispose a region for which processing has been completed in advance, that is, a region of which labeling information is determined in advance, in the processing target image. For example, a region 1122 may have labeling information determined in advance, and the apparatus for processing data may dispose the region 1122 in the processing target image 1100. This may enable the apparatus for processing data to evaluate the reliability of the data processor terminal using the region 1122, of which labeling information is determined in advance. For example, the data processor terminal may match labeling information with respect to the region 1122, of which labeling information is determined in advance, and in operation S400 to be described below, the apparatus for processing data may verify the labeling information matched with the region 1122 by the data processor terminal. The apparatus for processing data may compare the labeling information determined in advance for the region 1122 with the labeling information matched by the data processor terminal. When a result of the comparison is that the labeling information matched by the data processor terminal is different from the labeling information determined in advance, the reliability of the data processor terminal may be evaluated as low. According to embodiments, the apparatus for processing data may numerically calculate the estimated reliability.

In addition, according to embodiments, the region 1122, of which labeling information is determined in advance, may be included in another processing target image in addition to the processing target image 1100. In this case, the other processing target image may be subject to labeling by another data processor terminal. Accordingly, the apparatus for processing data may evaluate the reliability of a plurality of data processor terminals using the region 1122 of which the labeling information is determined in advance.

In addition, in one embodiment, in the process of segmenting the original image in operation S200, the segmented regions may be assigned identification information, and the identification information may include location information of the segmented region in the original image. The apparatus for processing data may generate the processing target image using the location information included in the identification information of the segmented region in operation S300. Accordingly, the number of features of the original image and the number of features of the processing target image may be the same or may be different by less than or equal to a predetermined number. For example, the face region 1110 may include features of two eyes, two noses, and two corners of the mouth, which is different in number from features of the original image by less than or equal to a predetermined number. Since the location information of the segmented region is used in generating the processing target image, the concentration level when performing the processing task of the data processor terminal may increase.

In addition, in another embodiment, in the process of segmenting the original image in operation S200, the segmented regions may be assigned identification information, and the identification information may include information about the original image. For example, identification information of regions segmented from a first original image may be #1, and identification information of regions segmented from a second original image may be #2. The apparatus for processing data may generate a processing target image based on regions segmented from a plurality of original images, in which the locations of the segmented regions in the processing target image may be the same as those in the original image.

Figure 6:
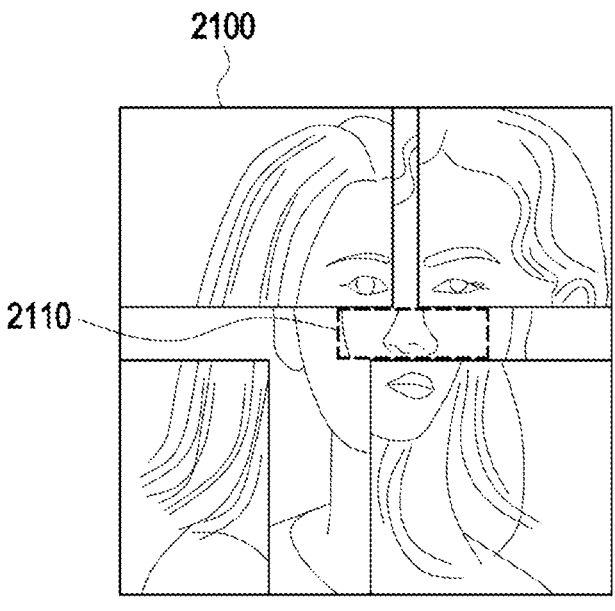
Figure 6:
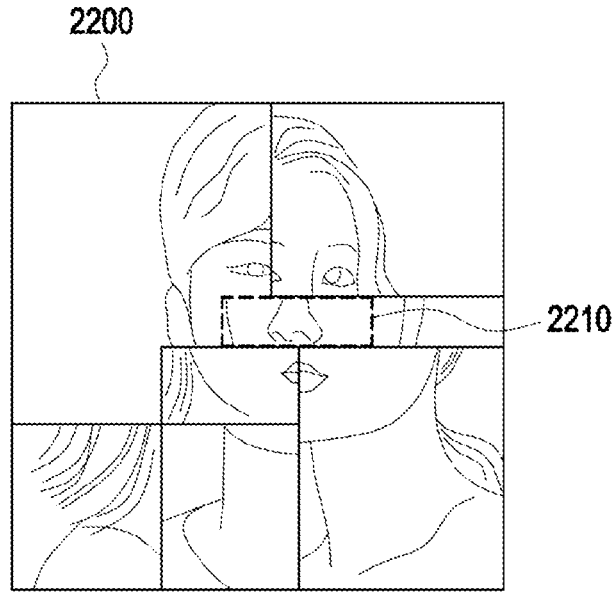

Referring to FIG. 6, a first processing target image 2100 and a second processing target image 2200 may be generated based on segmented regions of three facial images. The apparatus for processing data may dispose the same segmented regions 2110 and 2210 in the first processing target image 2100 and the second processing target image 2200. This may be to evaluate the accuracy of labeling information without a process of inspecting labeling information according to an embodiment. For example, when the same segmented regions 2110 and 2210 are disposed in ten processing target images including the first processing target image 2100 and the second processing target image 2200, each data processor terminal may perform labeling on the same segmented regions. The apparatus for processing data may compare labeling information obtained by each data processor terminal subjecting the same segmented region to labeling. For example, when labeling information on the same segmented region resulting from labeling by nine data processor terminals is the same, but labeling information on the same segmented region resulting from labeling by one data processor terminal is different, the apparatus for processing data may evaluate the accuracy of the different labeling information at a low level. In addition, the apparatus for processing data may set labeling information on the same segmented region as the same labeling information.

In addition, when labeling information on the same segmented region is acquired from nine data processor terminals, but labeling information on the same segmented region is not acquired from one data processor terminal, the apparatus for processing data may evaluate that the one data processor terminal misses the labeling for the same segmented region.

Figure 7:
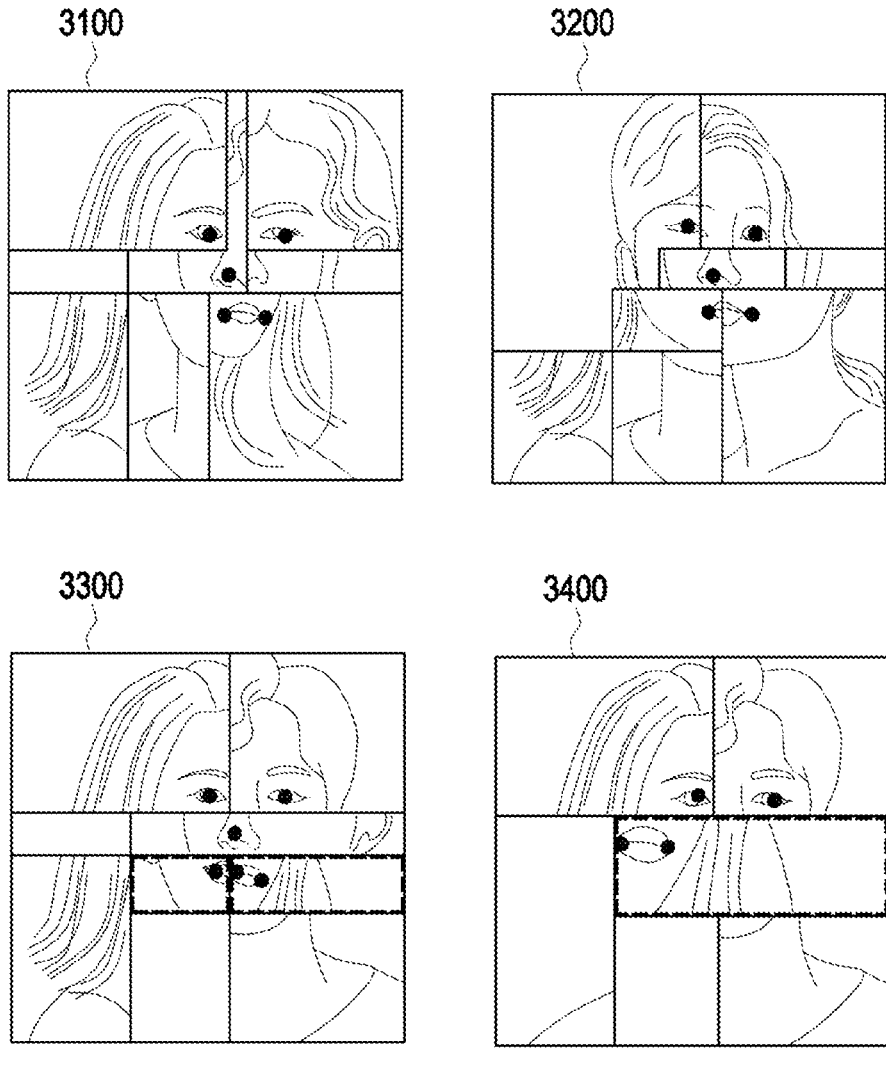

Referring to FIG. 7, the apparatus for processing data may generate a new processing target image based on a processed image on which processing has been performed in advance. For example, the apparatus for processing data may generate a new processing target image using labeling information regarding a processed image on which processing has been performed in advance.

Specifically, processing target images may be generated based on segmented regions of three face images. In addition, the apparatus for processing data may acquire processed images 3100 and 3200, in which feature points of an eye, a nose, and a corner of a mouth of the processing target images are included as labeling information, from one or more data processor terminals. In this case, the labeling information of the processed images 3100 and 3200 may include feature points of two eyes, one nose, and two corners of a mouth. The apparatus for processing data may generate new processing target images 3300 and 3400 based on segmented regions of three face images of the processed images 3100 and 3200. In this case, the apparatus for processing data may generate the processing target images 3300 and 3400 based on the labeling information. As an example, the apparatus for processing data may use the labeling data to identify that the processing target image generated based on segmented regions of three face images needs to include feature points of two eyes, one nose, and two corners of a mouth. Accordingly, the apparatus for processing data may generate a processing target image to include the above-described five feature points. As a specific example, the processing target image 3300 may include three feature points of the corners of the mouth. In this case, the processing target image 3300 includes feature points of the corners of the mouth redundantly, and thus the apparatus for processing data may modify or regenerate the processing target image 3300 to prevent the feature points of the corners of the mouth from being redundant.

As another specific example, in the case of the processing target image 3400, the feature point of the nose may be omitted. In this case, the apparatus for processing data may modify or regenerate the processing target image 3400 to include the feature point of the nose.

Figure 8:
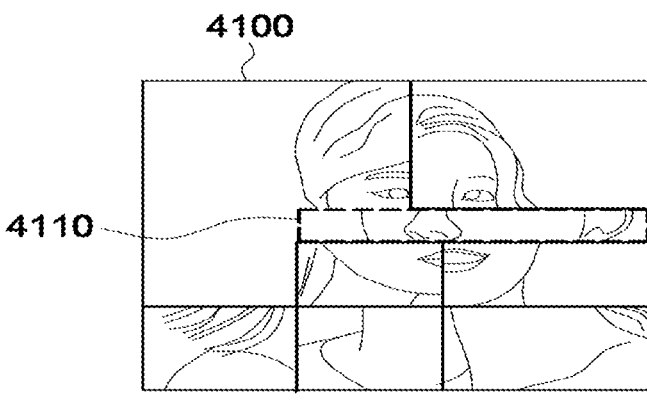
Figure 8:
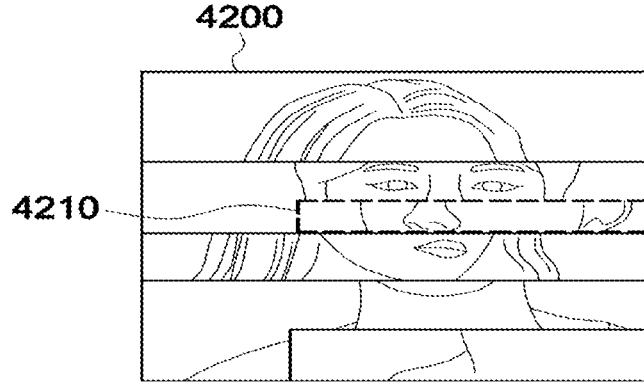
Figure 8:
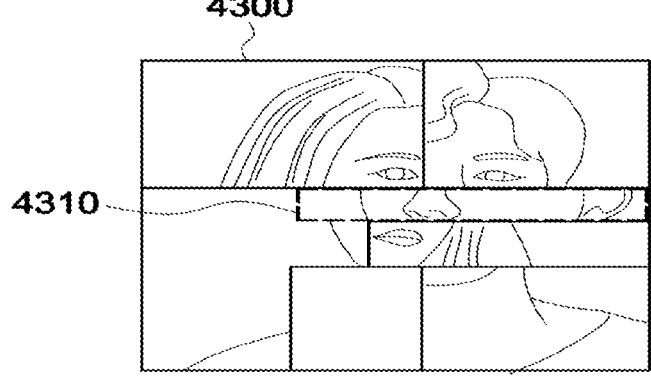

Referring to FIG. 8, a first processing target image 4100 to a third processing target image 4300 may be generated based on segmented regions of three face images. The apparatus for processing data may dispose the same segmented regions 4110, 4210, and 4310 in the first processing target image 4100 to the third processing target image 4300, respectively. As described above, this may be to evaluate the accuracy of labeling information without a separate inspection process by arranging the same segmented regions 4110, 4210, and 4310 in the processing target images 4100, 4200, and 4300, respectively.

In addition, in one embodiment, the apparatus for processing data may identify labeling information of the same segmented regions 4110, 4210, and 4310 in advance. In this case, the apparatus for processing data may generate the processing target images 4100, 4200, and 4300 such that it is difficult for the user of the data processor terminal, that is, a data processor, to identify the same segmented regions 4110, 4210, and 4310. For example, the apparatus for processing data may dispose segmented regions such that the size of a region with which labeling information is matched in advance is smaller than the average size of the segmented regions included in the processing target image, or dispose a region with which labeling information is matched in advance on the side of the processing target image, so that it is difficult for a data processor to identify the region with which labeling information is matched in advance. For example, the apparatus for processing data may generate a processing target image such that the location of a region with which labeling information is matched in advance in the original image is different from the location of that in the processing target image.

In addition, referring again to FIG. 3, in operation S400, the apparatus for processing data may verify the image processed by the data processor terminal. The apparatus for processing data, after generating a processing target image in operation S300, may provide the processing target image to the data processor terminal. Thereafter, the apparatus for processing data may acquire a processed image, e.g., an image including matched labeling information for the processing target image, from the data processor terminal. The apparatus for processing data may acquire the labeling information based on the image including matched labeling information. Alternatively, the apparatus for processing data may acquire only the labeling information regarding the processing target image from the data processor terminal.

Operation S400 will be described using FIGS. 9 and 10.

Figure 9:
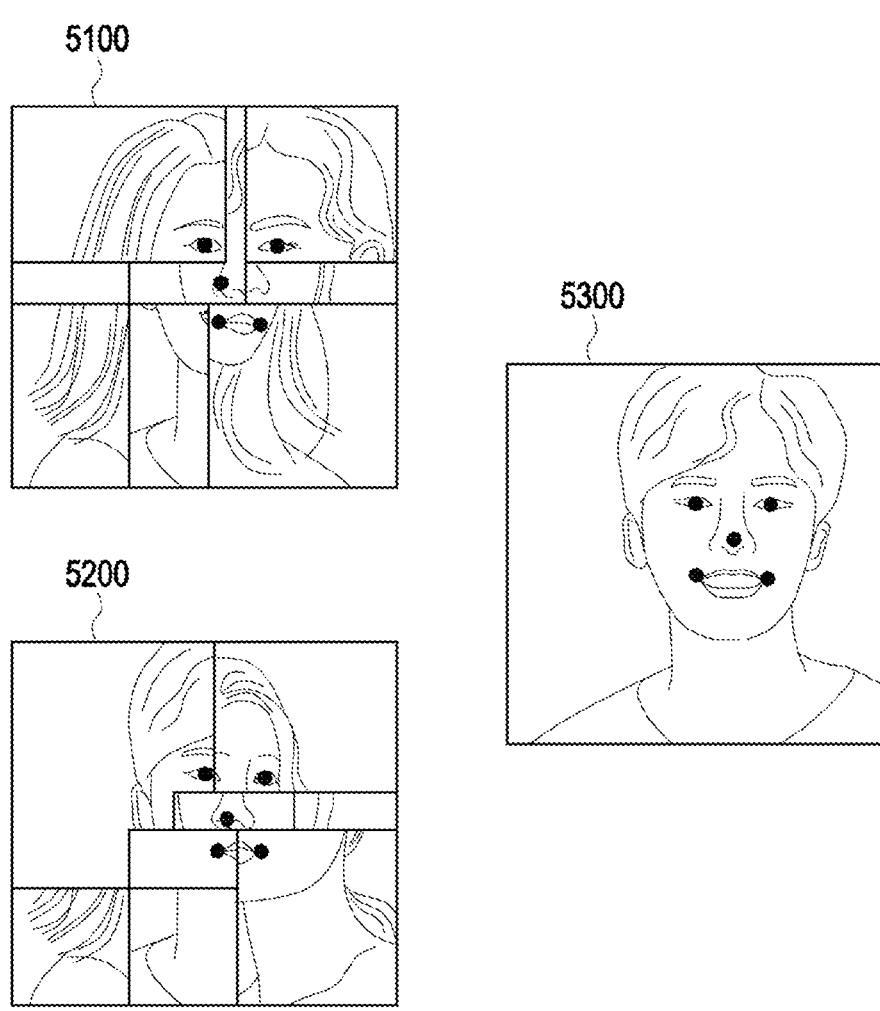
FIG. 9 is a diagram for describing verification of processed images according to an embodiment.

FIG. 9 is a diagram for describing verification of processed images according to an embodiment.

Referring to FIG. 9, processed images 5100 and 5200 may include labeling information regarding feature points. The processed images 5100 and 5200 include regions obtained by segmenting the original images in operation S200, and the apparatus for processing data may integrate segmented regions having the same original image. For example, when an original image is segmented into a plurality of regions in operation S200, identification information may be included in the segmented regions. In this case, the identification information may include information about the original image and location information. The apparatus for processing data may restore at least a part of the original image 5300 based on identification information of each region included in the processed images 5100 and 5200. For example, the apparatus for processing data may restore at least a part of the original image 5300 from a plurality of processed images including the processed images 5100 and 5200 using identification information of each region. In this case, the restored at least a part of the original image 5300 may include labeling information of feature points. The apparatus for processing data may acquire the labeling information of the feature points.

Figure 10:
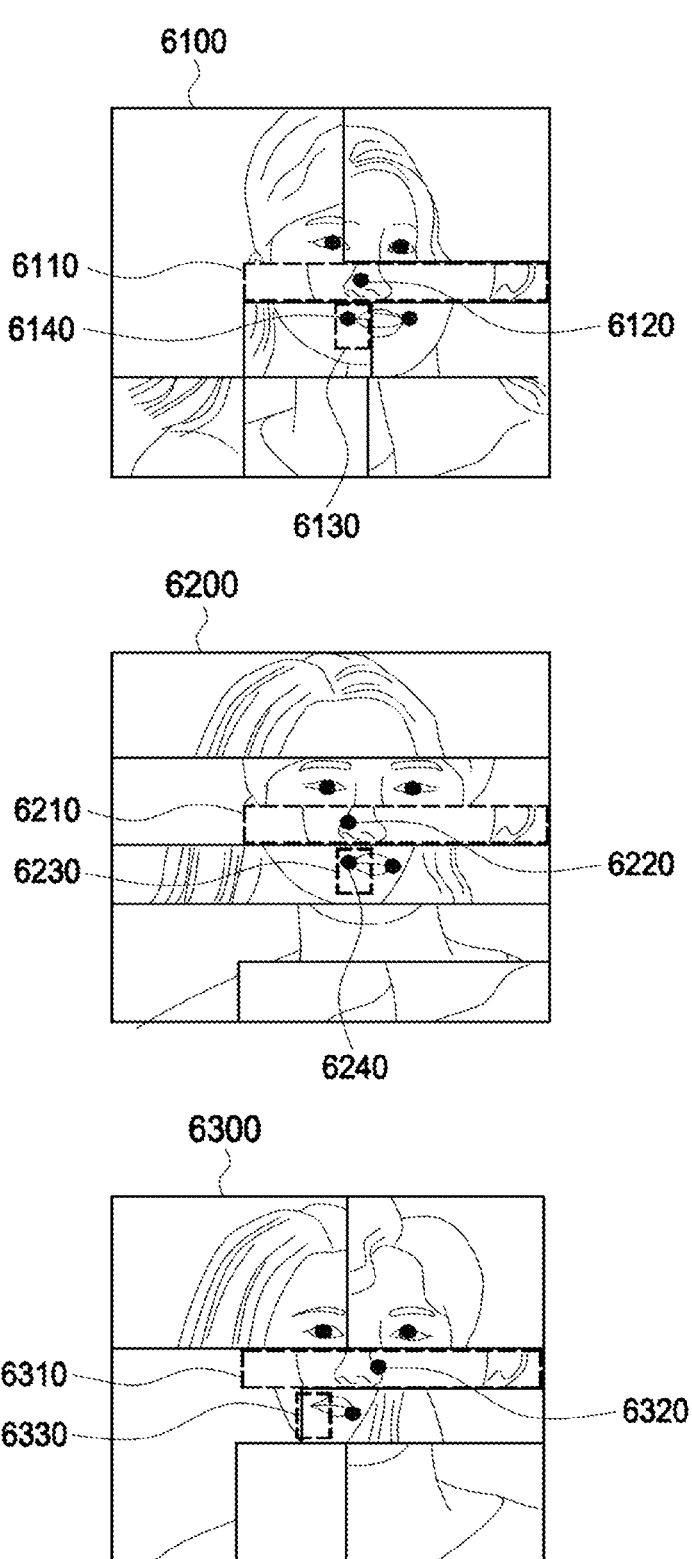
FIG. 10 is a diagram for describing processed images including labeling information of the processing target images of FIG. 8 according to an embodiment.

FIG. 10 is a diagram for describing processed images including labeling information of the processing target images of FIG. 8.

Referring to FIG. 10, processed images 6100 to 6300 may be images including labeling information regarding feature points of the processing target images 4100 to 4300 shown in FIG. 8. Similar to FIG. 8, the processed images 6100 to 6300 may include the same segmented regions 6110, 6210, and 6310.

In one embodiment, the apparatus for processing data may determine whether labeling information about the same segmented regions 6110, 6210, and 6310 matches. The apparatus for processing data may determine whether labeling information about the same segmented regions 6110, 6210, and 6310 is true values or false values based on a result of the determination. For example, when a result of the determination is that the labeling information 6120, 6220, and 6320 about the same segmented regions 6110, 6210, and 6310 matches, each of the pieces of labeling information about the same segmented regions 6110, 6210, and 6310 may be determined to be a true value. In addition, when a result of the determination is that the labeling information 6120, 6220, and 6320 about the same segmented regions 6110, 6210, and 6310 does not match as shown in FIG. 10, that is, when the position of the labeling information 6320 in the third processed image 6300 is different from those of the other labeling information 6120 and 6220, the apparatus for processing data determines that the labeling information 6120 and 6120 is true values, and the labeling information 6320 is a false value.

In addition, although not shown in FIG. 8, the processed images 6100 to 6300 of FIG. 10 may include the same segmented regions 6130, 6230, and 6330 of the corner of the mouth, and may include labeling information 6140 and 6160 about the same segmented regions 6130, 6230, and 6330. In this case, as shown in FIG. 10, only the processed image 6300 may include no labeling information about the same segmented regions 6130, 6230, and 6330. In this case, the apparatus for processing data may, upon identifying the labeling information 6140 and 6240 about the same segmented regions 6130 and 6230 in the first processed image 6100 and the second processed image 6200 and identifying no labeling information about the same segmented region 6330 in the third processed image 6300, determine that the labeling information about the same segmented region 6330 is missing.

The various embodiments of the present disclosure may be implemented by software including one or more instructions stored in a storage medium (e.g., a machine-readable storage medium) that can be read by a machine (e.g., a computer). For example, the machine is a device that may invoke an instruction from the storage medium and operate to perform a function according to the invoked instruction, and may include an electronic device according to the disclosed embodiments. When executed by a processor, the processor may a function according to the instruction directly or using other components under the control of the processor. The instruction may include codes generated by a compiler or codes executable by an interpreter. The machine-readable storage medium may be provided in the form of a non-transitory storage medium. Here, when a storage medium is referred to as "non-transitory," it can be understood that the storage medium is tangible and does not include a signal, but this is not a distinction between data being semi-permanently or temporarily stored in the storage medium. For example, a "non-transitory storage medium" may include a buffer in which data is temporarily stored.

According to one embodiment, the methods according to the various embodiments disclosed herein may be provided in a computer program product. The computer program product may be traded between a seller and a buyer as a product. The computer program product may be distributed in the form of a machine-readable storage medium (e.g., a compact disc-read only memory (CD-ROM)) or may be distributed through an application store (e.g., Play Store™) online. In the case of online distribution, at least a portion of the computer program product (e.g., a downloadable app) may be stored at least semi-permanently or may be temporarily generated in a machine-readable storage medium, such as a memory of a server of a manufacturer, a server of an application store, or a relay server.

As is apparent from the above, exposure of personal information that can occur in a data processing process, such as a labeling process, can be prevented.

The effects of the present application are not limited to the above-described effects, and effects not described may be clearly understood by those of ordinary skill in the art from the present specification and the accompanying drawings.

While some embodiments have been particularly shown and described, it will be understood by one of ordinary skill in the art that variations in form and detail may be made therein without departing from the spirit and scope of the claims. For example, appropriate results may be achieved even if the described features or aspects within each device or method according to the embodiments are performed in an order different from the described methods, and/or the components such as a system, a structure, device, and a circuit are combined or coupled in a form different from that of the described methods, and/or are replaced or substituted with other components or equivalents thereof.

Therefore, other implementations, other embodiments, and equivalents to the claims may be included in the scope of the claims that follow.

What is claimed is:

1. A method of processing data which is a method for providing a data processor terminal with processing target data, the method comprising:

acquiring a first original image and a second original image;

segmenting the first original image into a plurality of regions including a first region;

segmenting the second original image into a plurality of regions including a second region;

generating a first processing target image including at least a partial region of the first region and at least a partial region of the second region;

providing the generated first processing target image to a data processor terminal; and acquiring labeling information of the first processing target image from the data processor terminal, wherein the generating of the first processing target image including the at least a partial region of the first region and the at least a partial region of the second region includes generating a second processing target image including the first region, and wherein the first processing target image and the second processing target image include the first region which is the same, and wherein when the first processing target image is provided to a first data processor terminal, the second processing target image is provided to a second data processor terminal, and a third processing target image including the first region is provided to a third data processor terminal, further comprising:

acquiring first labeling information of the first region included in the first processing target image from the first data processor terminal;

acquiring second labeling information of the first region included in the second processing target image from the second data processor terminal; and acquiring third labeling information of the first region included in the third processing target image from the third data processor terminal, wherein the first labeling information, the second labeling information, and the third labeling information are compared to determine whether the first labeling information, the second labeling information, and the third labeling information are true values.

2. The method of claim 1, wherein the generating of the first processing target image including the at least a partial region of the first region and the at least a partial region of the second region includes, when the first region is related to security information, performing masking on the at least a partial region of the first region.

3. The method of claim 1, wherein:

the segmenting of the first original image into the plurality of regions including the first region includes segmenting the first region into a plurality of sub regions including a first sub region and a second sub region when the first region is related to security information, and the generating of the first processing target image including the at least a partial region of the first region and the at least a partial region of the second region includes:

generating the first processing target image using the first sub region, and wherein the second sub region is used for generation of the second processing target image different from the first processing target image.

4. The method of claim 1, wherein, when the first original image and the second original image are faces, the first region includes a first feature of the face, the second region includes a second feature, which is different from the first feature, of the face, and the first processing target image includes the first region including the first feature and the second region including the second feature.

5. The method of claim 1, further comprising, when labeling information of the first region has been acquired in advance:

acquiring labeling information of the first region from the data processor terminal;

comparing the labeling information of the first region having been acquired in advance with the labeling information of the first region acquired from the data processor terminal; and evaluating a reliability of the data processor terminal based on a result of the comparison.

6. The method of claim 1, wherein, when the plurality of regions acquired by segmenting the first original image include a third region, and the first processing target image includes the first region, the second region, and the third region, the acquiring of the labeling information of the first processing target image from the data processor terminal includes:

acquiring a processed image including labeling information of the first processing target image;

restoring at least a part of the first original image based on the processed image; and acquiring labeling information of the first region and labeling information of the third region from the restored at least a part of the first original image.

7. A non-transitory computer-readable recording medium having a program recorded thereon to perform or control performance of operations comprising:

acquiring a first original image and a second original image;

segmenting the first original image into a plurality of regions including a first region;

segmenting the second original image into a plurality of regions including a second region;

generating a first processing target image including at least a partial region of the first region and at least a partial region of the second region;

providing the generated first processing target image to a data processor terminal; and acquiring labeling information of the first processing target image from the data processor terminal wherein the generating of the first processing target image including the at least a partial region of the first region and the at least a partial region of the second region includes generating a second processing target image including the first region, and wherein the first processing target image and the second processing target image include the first region which is the same, and wherein when the first processing target image is provided to a first data processor terminal, the second processing target image is provided to a second data processor terminal, and a third processing target image including the first region is provided to a third data processor terminal, further comprising:

acquiring first labeling information of the first region included in the first processing target image from the first data processor terminal;

acquiring second labeling information of the first region included in the second processing target image from the second data processor terminal; and acquiring third labeling information of the first region included in the third processing target image from the third data processor terminal, wherein the first labeling information, the second labeling information, and the third labeling information are compared to determine whether the first labeling information, the second labeling information, and the third labeling information are true values.

8. The non-transitory computer-readable recording medium of claim 7, wherein the generating of the first processing target image including the at least a partial region of the first region and the at least a partial region of the second region includes, when the first region is related to security information, performing masking on the at least a partial region of the first region.

9. The non-transitory computer-readable recording of claim 7, wherein:

the segmenting of the first original image into the plurality of regions including the first region includes segmenting the first region into a plurality of sub regions including a first sub region and a second sub region when the first region is related to security information, and the generating of the first processing target image including the at least a partial region of the first region and the at least a partial region of the second region includes:

generating the first processing target image using the first sub region, and wherein the second sub region is used for generation of the second processing target image different from the first processing target image.

10. The non-transitory computer-readable recording medium of claim 7, wherein, when the first original image and the second original image are faces, the first region includes a first feature of the face, the second region includes a second feature, which is different from the first feature, of the face, and the first processing target image includes the first region including the first feature and the second region including the second feature.

11. The non-transitory computer-readable recording medium of claim 7, the operations further comprising when labelling information of the first region has been acquired in advance:

acquiring labeling information of the first region from the data processor terminal;

comparing the labeling information of the first region having been acquired in advance with the labeling information of the first region acquired from the data processor terminal; and evaluating a reliability of the data processor terminal based on a result of the comparison.

12. The non-transitory computer-readable recording medium of claim 7, wherein, when the plurality of regions acquired by segmenting the first original image include a third region, and the first processing target image includes the first region, the second region, and the third region, the acquiring of the labeling information of the first processing target image from the data processor terminal includes:

acquiring a processed image including labeling information of the first processing target image;

restoring at least a part of the first original image based on the processed image; and acquiring labeling information of the first region and labeling information of the third region from the restored at least a part of the first original image.

13. An apparatus for processing data which is an apparatus for providing a data processor terminal with processing target data, the apparatus comprising:

a memory unit; and a control unit configured to perform an operation based on an instruction included in the memory unit, wherein the control unit is configured to:

acquire a first original image and a second original image;

segment the first original image into a plurality of regions including a first region;

segment the second original image into a plurality of regions including a second region;

generate a first processing target image including at least a partial region of the first region and at least a partial region of the second region;

provide the generated first processing target image to a data processor terminal; and acquire labeling information of the first processing target image from the data processor terminal, wherein the control unit is configured to generate a second processing target image including the first region, wherein the first processing target image and the second processing target image include the first region which is the same, wherein when the first processing target image is provided to a first data processor terminal, the second processing target image is provided to a second data processor terminal, and a third processing target image including the first region is provided to a third data processor terminal, wherein the control unit is configured to:

acquire first labeling information of the first region included in the first processing target image from the first data processor terminal;

acquire second labeling information of the first region included in the second processing target image from the second data processor terminal; and acquire third labeling information of the first region included in the third processing target image from the third data processor terminal, and wherein the first labeling information, the second labeling information, and the third labeling information are compared to determine whether the first labeling information, the second labeling information, and the third labeling information are true values.

14. The method of claim 3, wherein the generating of the first processing target image including the at least a partial region of the first region and the at least a partial region of the second region includes arranging the first sub region within the first processing target image such that a user of the data processor terminal has difficulty identifying the first region, when labeling information of the first region has been acquired in advance.

15. The non-transitory computer-readable recording medium of claim 9, wherein the generating of the first processing target image including the at least a partial region of the first region and the at least a partial region of the second region includes arranging the first sub region within the first processing target image such that a user of the data processor terminal has difficulty identifying the first region, when labeling information of the first region has been acquired in advance.

* * * * *